United States Patent
Rothman et al.

(10) Patent No.: US 7,406,591 B2
(45) Date of Patent: Jul. 29, 2008

(54) BOOTING FROM A REMOTE BIOS IMAGE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 10/879,456

(22) Filed: Jun. 29, 2004

(65) Prior Publication Data

US 2006/0020837 A1      Jan. 26, 2006

(51) Int. Cl.
G06F 19/00 (2006.01)
(52) U.S. Cl. .......................................... 713/2
(58) Field of Classification Search ............... 713/2
See application file for complete search history.

(56) References Cited

U.S. PATENT DOCUMENTS

| 5,230,052 A | * | 7/1993 | Dayan et al. ................ 713/2 |
| 5,349,640 A | * | 9/1994 | Dunn et al. .................. 370/271 |
| 5,978,912 A | * | 11/1999 | Rakavy et al. ................ 713/2 |
| 6,324,644 B1 | * | 11/2001 | Rakavy et al. ................ 713/1 |
| 6,421,777 B1 | * | 7/2002 | Pierre-Louis et al. .......... 713/2 |
| 6,438,688 B1 | * | 8/2002 | Nunn ........................... 713/2 |
| 6,594,757 B1 | * | 7/2003 | Martinez ...................... 713/2 |
| 6,715,074 B1 | * | 3/2004 | Chaiken ..................... 713/164 |
| 6,732,267 B1 | | 5/2004 | Wu et al. |
| 2002/0178242 A1 | * | 11/2002 | Eda ............................ 709/222 |
| 2004/0268106 A1 | * | 12/2004 | Holmberg et al. .............. 713/1 |
| 2005/0108513 A1 | * | 5/2005 | Lam ............................ 713/2 |

* cited by examiner

Primary Examiner—Kambiz Zand
Assistant Examiner—Peter Poltorak
(74) Attorney, Agent, or Firm—Blakely, Sokoloff, Taylor & Zafman LLP

(57) ABSTRACT

A method, system and article of manufacture to boot a computer system from a remote Basic Input/Output System (BIOS) image. A request for a local Basic Input/Output System (BIOS) image of a computer system is intercepted by a controller of the computer system. A remote BIOS image for the computer system is retrieved from a remote computer system communicatively coupled to the computer system via the controller. The remote BIOS image is executed by the computer system.

25 Claims, 8 Drawing Sheets

BOOTING FROM A REMOTE BIOS IMAGE

BACKGROUND

1. Field

Embodiments of the invention relate to the field of computer systems and more specifically, but not exclusively, to booting from a remote Basic Input/Output System (BIOS) image.

2. Background Information

Generally, the pre-boot phase is defined as the period of time between computer system startup and the OS taking control of the system. At the startup of a typical computer system, a BIOS image is loaded from non-volatile storage, such as Flash memory, and executed. The system BIOS initializes the platform hardware, performs system tests, and prepares the system for the operating system (OS) to take control.

When the OS takes control of the system, the period commonly known as OS runtime begins. During OS runtime, the system BIOS may act as an interface between software and hardware components of a computer system. Such interface services include assisting with software interrupts.

The system BIOS of many of today's computer systems are limited by the size and cost of Flash memory devices. For low-margin systems, such as desktops, the cost of Flash parts and the amount of functionality that may be embedded is of concern. A conflict exists between minimizing the number of Flash devices to save money versus including additionally functionality in the system BIOS.

In enterprise level systems, while the cost of Flash devices is a consideration, the greater concern is the ability to fit all the desired functions and Original Equipment Manufacturer (OEM) value-added features in a limited Flash size profile. Manufacturers may not be able to provide all the desired capabilities in a platform due to non-volatile storage limitations.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
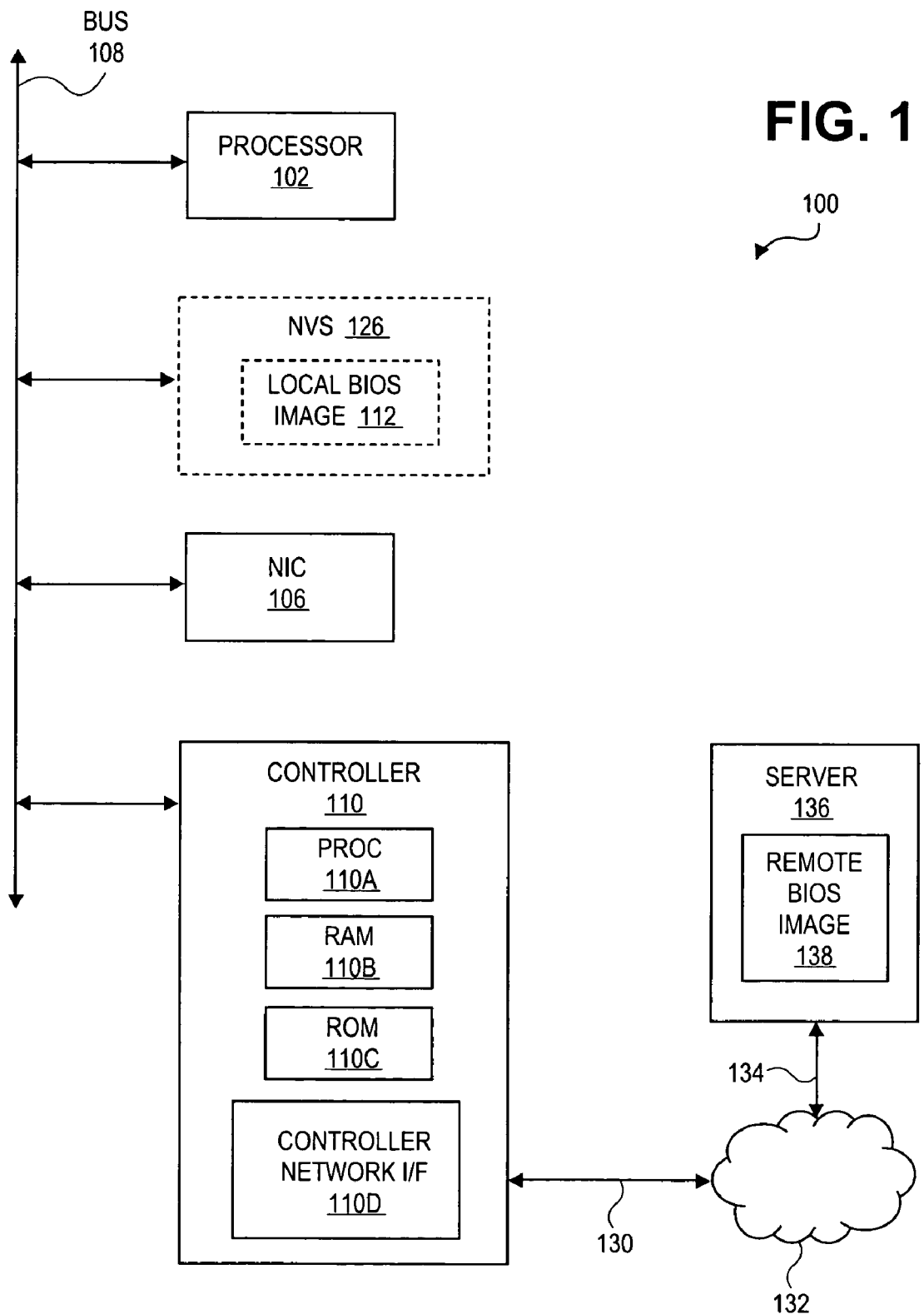
FIG. 1 is a block diagram illustrating one embodiment of an environment that supports booting from a remote BIOS image in accordance with the teachings of the present invention.

Referring to FIG. 1, one embodiment of a computer system 100 is shown. Computer system 100 includes a processor 102, a non-volatile storage (NVS) 126, a network interface card (NIC) 106, and a controller 110 coupled to a bus 108. In one embodiment, processor 102 may include a central processing unit (CPU).

NVS 106 has stored a local BIOS image 112. In one embodiment, the local BIOS image 112 may include a simplified system BIOS for computer system 100 in case a remote BIOS image is unavailable (discussed further below).

In one embodiment, NVS 106 may include one or more Flash memory devices. Such Flash memory devices may be parallel or serial. NVS 126 is illustrated with dotted lines to indicate that in some embodiments, NVS 126 is physically present in computer system 100, while in other embodiments, NVS 126 is not physically present in computer system 100. As described below, in one embodiment, access requests to NVS 126 are intercepted and diverted to a remote computer system.

FIG. 1 shows that controller 110 may be coupled to network 132 by connection 130. A remote computer system, such as server 136, having stored a remote BIOS image (RBI) 138 may be coupled to network 132 via connection 134. Connections 130 and 134 include wired connections, wireless connections, or any combination thereof. Remote BIOS image 138 may be stored on server 136 in magnetic storage, optical storage, non-volatile storage, or the like.

In one embedment, remote BIOS image 136 may include the system BIOS for computer system 100. During pre-boot, the system BIOS initializes the computer system hardware. During OS runtime, the system BIOS may provide services to an OS executing on the computer system. The OS may communicate directly with hardware, or the OS may request services from the system BIOS and the system BIOS subsequently interacts with the hardware. Additionally, the system BIOS may initiate a transaction with computer system hardware without prompting from the OS.

In one embodiment, computer system 100 and server 136 may be part of an enterprise network. Server 136 may provide services to multiple computer systems within the enterprise network. In one embodiment, server 136 may be part of a centralized server facility, having one or more servers, with access to one or more storage facilities. In such an embodiment, remote BIOS image 138 may be stored at the centralized server facility or a storage facility.

In one embodiment, server 136 may include more than one remote BIOS image to support a corresponding more than one computer system communicatively coupled to server 136. In another embodiment, server 136 may include more than one remote BIOS image 138 designated for computer system 100. In such a particular embodiment, a flag indicates which remote BIOS image is active for use by computer system 100. In yet another embodiment, remote BIOS image 138 may be shared by two or more computer systems communicatively coupled to server 136.

In one embodiment, controller 110 may include a processor 110a, a Random Access Memory (RAM) 110b, and a Read-Only Memory (ROM) 110c operatively coupled together by a bus (not shown). In one embodiment, ROM 110c has stored firmware instructions to support booting from remote BIOS image 138, as described herein.

In one embodiment, controller 110 may include a controller network interface 110d for communicating over network 132 to server 136. In another embodiment, controller network interface 110d provides a network connection distinct from the network connection available from NIC 106. In yet another embodiment, controller network interface 110d has a Media Access Control (MAC) address and an Internet Protocol (IP) address separate from the MAC and IP address of NIC 106. Controller 110 may communicate over such a network during the pre-boot phase and OS runtime. In one embodiment, the controller network interface 110d uses an Ethernet compatible connection (see, *Institute of Electrical and Electronic Engineers (IEEE)* 802.3 *Carrier Sense, Multiple Access with Collision Detection (CSMA/CD)*). In one embodiment, controller network interface 110d communicates with server 136 using IP.

In one embodiment, controller network interface 110d may provide an out-of-band (OOB) manageability port for local system 100. Such a manageability port may be used by a system administrator to access and manage local system 100 over a network, such as an enterprise network. In one embodiment, controller 110 may serve as a Local Area Network (LAN) microcontroller.

In one embodiment, local controller 110 and its network capabilities are not known to the user, but local controller 110 may operate in the background during pre-boot and runtime phases of local system 100. In another embodiment, an operating system executing on local system 100 may be unaware of the presence of local controller 110 and may be unaware of the interaction of local controller 110 with components of local system 100, such as memory.

In one embodiment, controller 110 may be initialized at the beginning of startup of the computer system 100. In this particular embodiment, controller 110 is initialized when processor 102 is initialized. Thus, controller 110 may be available immediately after startup.

In another embodiment, controller 110 is active during a standby power state, such as a sleep state, of computer system 100. Thus, when computer system 100 is awakened, controller 110 is available immediately.

In some embodiments, local BIOS image 112, remote BIOS image 138, instructions stored in ROM 110c, or any combination thereof, may support the Extensible Firmware Interface (EFI) (*Extensible Firmware Interface Specification*, Version 1.10, Dec. 1, 2002, available at http://developer.intel.com/technology/efi.*) EFI enables firmware, in the form of firmware modules and drivers, to be loaded from a variety of different resources, including Flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, Version 0.9, Sep. 16, 2003 (available at www.intel.com/technology/framework). It will be understood that embodiments of the present invention are not limited to the "Framework" or implementations in compliance with the EFI specification.

Figure 2:
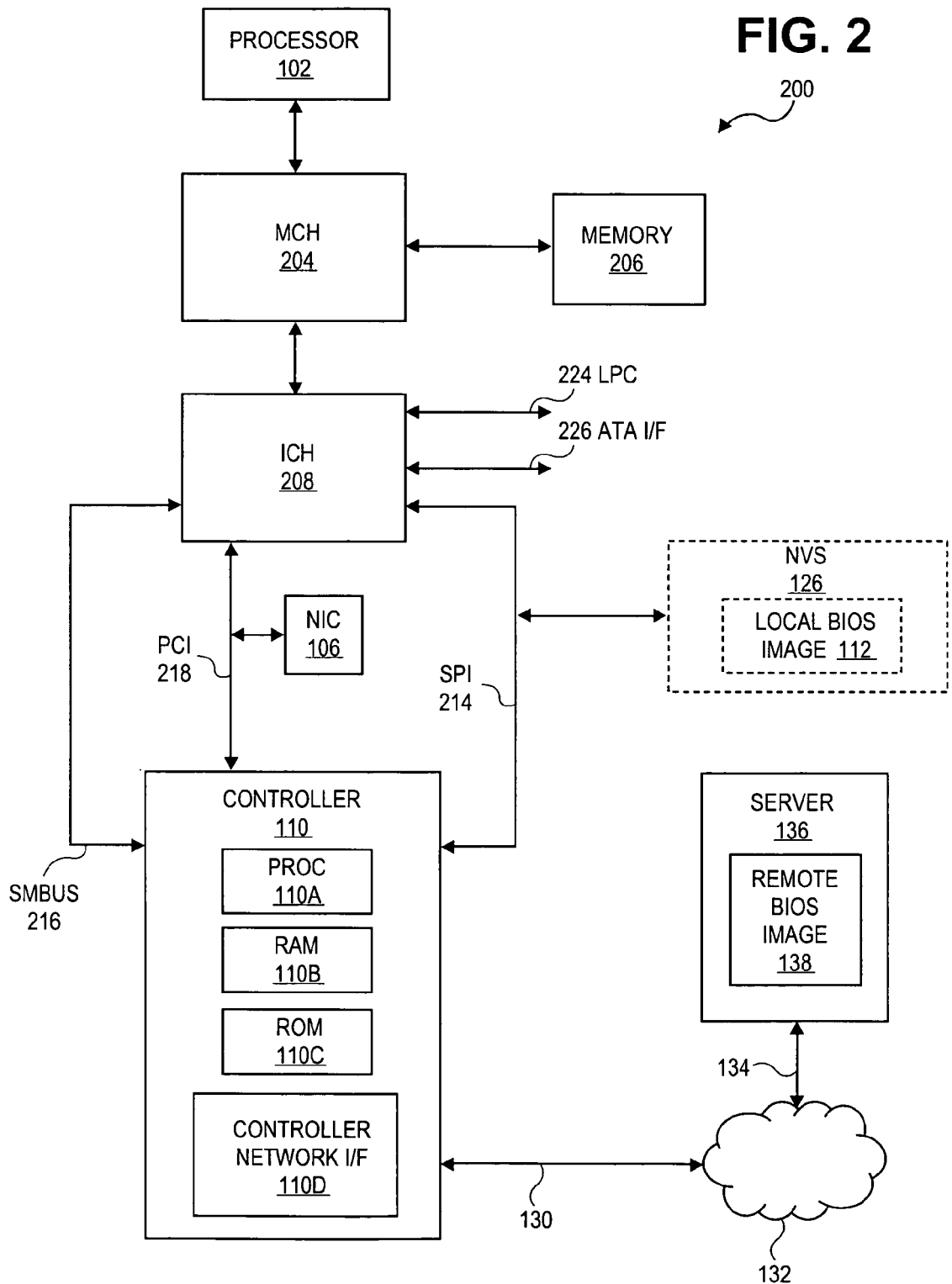
FIG. 2 is a block diagram illustrating one embodiment of an environment that supports booting from a remote BIOS image in accordance with the teachings of the present invention.

Referring to FIG. 2, one embodiment of a computer system 200 is shown. An Input/Output (I/O) Controller Hub (ICH) 208 is coupled to a Memory Controller Hub (MCH) 204. In one embodiment, ICH 108 serves as an I/O controller and MCH 104 serves as a memory controller. In another embodiment, ICH 108 and MCH 104 are part of a chipset of computer system 200. In yet another embodiment, ICH 108, MCH 104, and controller 110 are integrated onto a motherboard of computer system 200.

Processor 102 and memory 206 are coupled to MCH 204. ICH 208 includes a connection to Low Pin Count (LPC) bus 224. In one embodiment, a Flash memory device having stored a local BIOS image (not shown) may be coupled to LPC bus 224. Various devices, such as a magnetic disk drive, an optical disk drive, or the like, may be coupled to ICH 208 using an Advanced Technology Attachment (ATA) interface 226 (see, *American National Standards Institute (ANSI) Advanced Technology Attachment (ATA)* specifications).

Controller 110 is coupled to ICH 208. In one embodiment, controller 110 may be coupled to ICH 208 via a System Management Bus (SMBUS) 216, a Peripheral Component Interface (PCI) bus 218, or a Serial Peripheral Interface (SPI) 214, or any combination thereof. In FIG. 2, NVS 126 is coupled to SPI 214.

SPI is a serial bus protocol that operates in full duplex and supports high bandwidth connections (up to 10 megabaud). Devices communicate with SPI using a master/slave relationship, in which the master initiates the data transfer. The SPI system includes two data lines and two control lines. A Master Out Slave In (MOSI) line supplies the output data from the master to the slave(s). The Master In Slave Out (MISO) line provides output data from a slave to the input of the master. The Serial Clock (SCLK) line is driven by the master and regulates the flow of the data. The Slave Select (SS) line is a control line that allows the master to select a slave device. If multiple slave devices exist, the master may generate a separate slave select signal for each slave.

In the embodiment of computer system 200, NIC 106 is coupled to PCI bus 218. PCI bus 218 may include PCI-X, PCI Express, or the like.

As shown in FIG. 2, controller 110 may be coupled to server 136 over network 132, where server 136 has stored remote BIOS image 138.

Figure 3:
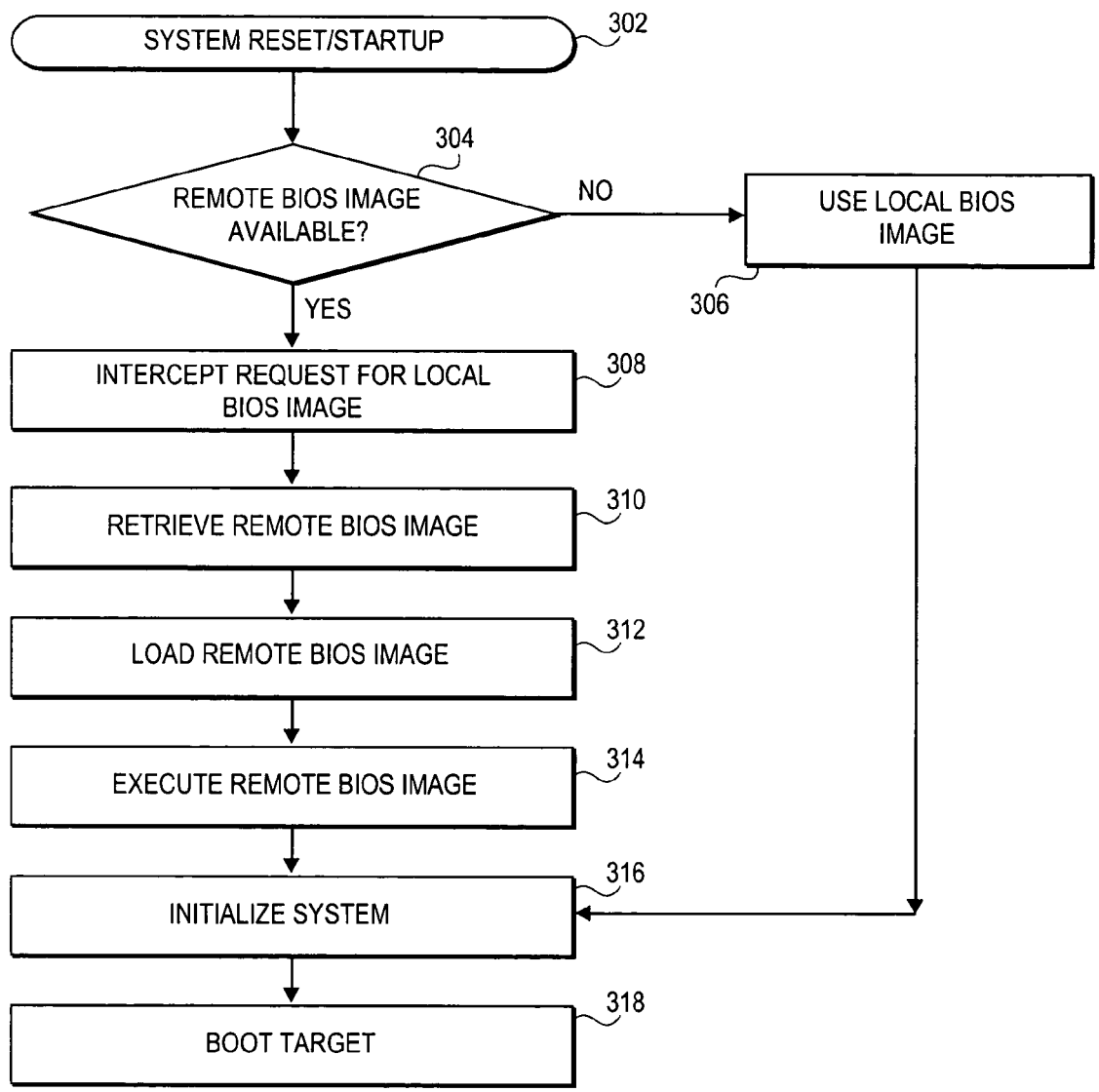
FIG. 3 is a flowchart illustrating one embodiment of the logic and operations to boot from a remote BIOS image in accordance with the teachings of the present invention.

Turning to FIG. 3, a flowchart 300 illustrates the logic and operations to boot from a remote BIOS image in accordance with one embodiment of the present invention. Starting in a block 302, a computer system is reset/started up. In another embodiment, the computer system is awakened from a sleep state, such as the S4 sleep state as described by the Advanced Configuration and Power Interface specification (see, *Advanced Configuration and Power Interface (ACPI) Specification*, Revision 2.0b, Oct. 11, 2002 (available at http://www.acpi.info)).

Continuing to a decision block 304, the logic determines if a remote BIOS image is available to the computer system. For example, the network connection to server 136 may be down, or server 136 may not be available. In another example, controller 110 may not be configured to support remote BIOS image booting.

If the answer to decision block 304 is no, then the logic proceeds to a block 306 where the computer system uses the local BIOS image 112 for booting. The logic then proceeds to a block 316 to initialize the system.

If the answer to decision block 304 is yes, then the logic proceeds to a block 308. As depicted in block 308, controller 110 intercepts a request for local BIOS image 112. In one embodiment, NVS 126 and controller 110 are both coupled to SPI 214. In this embodiment, by sharing the SPI link, controller 110 may "hear" the local BIOS image request and respond as NVS 126.

In one embodiment, the power-on of the computer system, as shown in block 302, resets a program counter register to a predetermined address known as a start vector. The start vector points to the beginning of a boot program in local BIOS image 112. Since the start vector of the computer system is known, controller 110 listens for a fetch request to the address of the start vector.

Proceeding to a block 310, controller 110 retrieves the remote BIOS image 138 from server 136. In a block 312, the remote BIOS image is loaded on the computer system. In one embodiment, the remote BIOS image 138 is loaded in an instruction cache of processor 102.

Continuing to a block 314, the remote BIOS image is executed on the computer system. The computer system is initialized, as shown in a block 316. Proceeding to a block 318, the target is booted. In one embodiment, the boot target is an operating system.

By providing the ability to route NVS fetches to an alternative location, such as a server, the limitations and costs associated with using a local NVS device are reduced. For example, in the case of Flash memory devices, embodiments described herein allow such costly Flash devices to be eliminated from a platform, and thus, reducing the bill of materials cost for a system motherboard.

Further, providing a "remote" NVS allows for a larger "virtual" NVS for use by the computer system. Functionality may be easily added to the remote BIOS image without the storage size limitations associated with NVS, such as Flash devices. Also, a system administrator working on the server side may easily perform a Flash update of several computer systems on a network by simply modifying their respective remote BIOS images.

Figure 4:
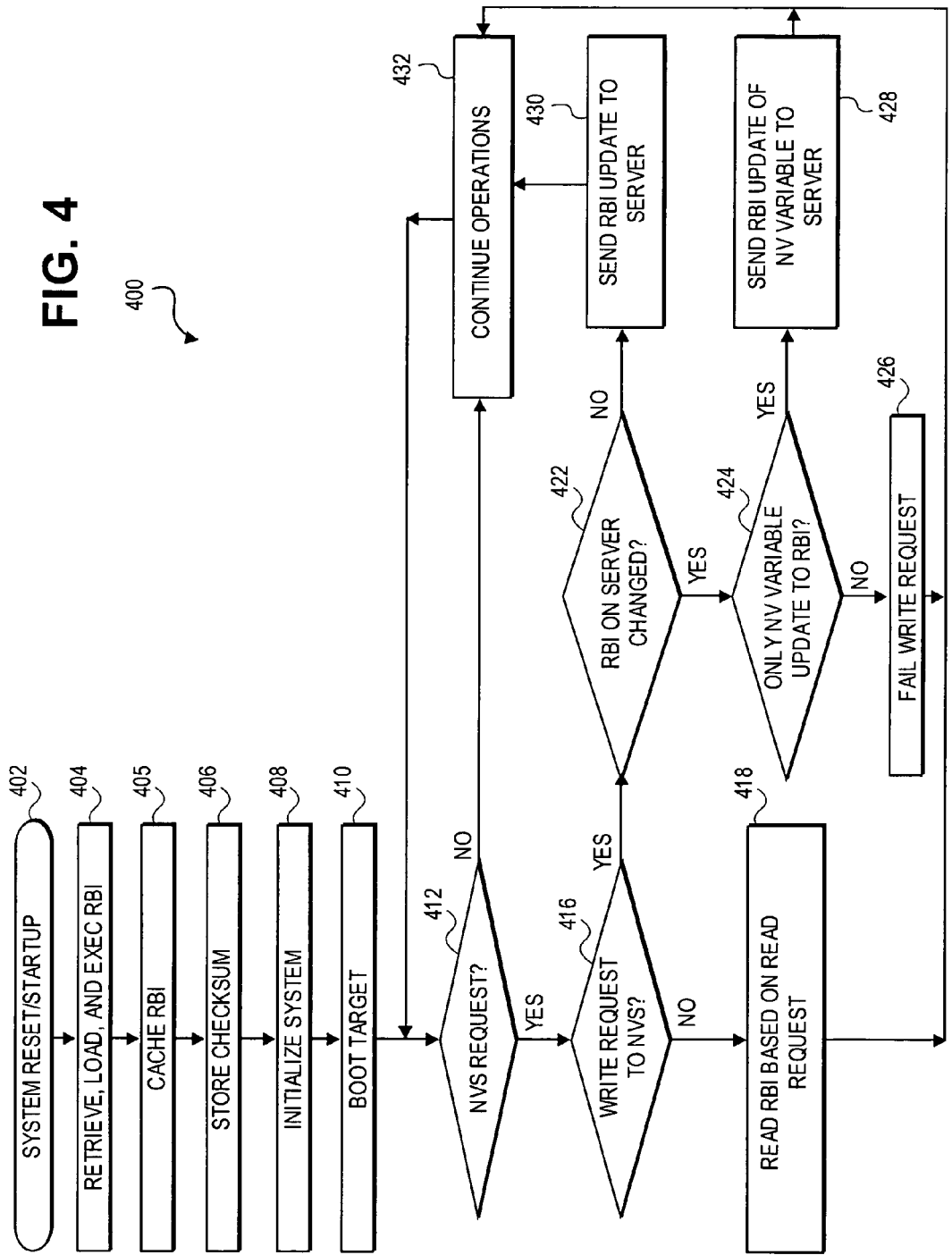
FIG. 4 is a flowchart illustrating one embodiment of the logic and operations to boot from a remote BIOS image in accordance with the teachings of the present invention.

Referring to FIG. 4, a flowchart 400 illustrates one embodiment of the logic and operations to boot from and update a remote BIOS image. In one embodiment, at least a portion of the logic and operations of flowchart 400 are realized as firmware instructions stored in a non-volatile storage device of controller 110, such as ROM 110c.

While RBI updates discussed in conjunction with FIG. 4 occur after the boot target is started, one skilled in the art will recognize that RBI updates may be performed during the pre-boot phase. In one embodiment, firmware instructions to provide updating of a remote BIOS image are loaded and executed during pre-boot and survive into OS runtime. Since the firmware instructions operate from the system BIOS environment, updating of the remote BIOS image may occur during pre-boot or during OS runtime independent of an OS executing on the computer system. Thus, a platform may update a remote BIOS image without being attached to an OS-level software solution.

Beginning in a block 402, a computer system is reset/started up. Continuing to a block 404, a remote BIOS image is retrieved, loaded, and executed similarly as described above in conjunction with FIG. 3.

Proceeding to a block 405, the remote BIOS image is cached at the computer system. In one embodiment, the remote BIOS image is cached in a shadow ROM memory area of the computer system. Caching the remote BIOS image at the computer system may reduce latency times associated with accessing the remote BIOS image on the server after the initial RBI retrieval.

Continuing to a block 406, a checksum associated with the remote BIOS image is stored on the computer system. The logic proceeds to a block 408 to initialize the system, and then to a block 410 to boot the target, such as an operating system.

Figure 5A:
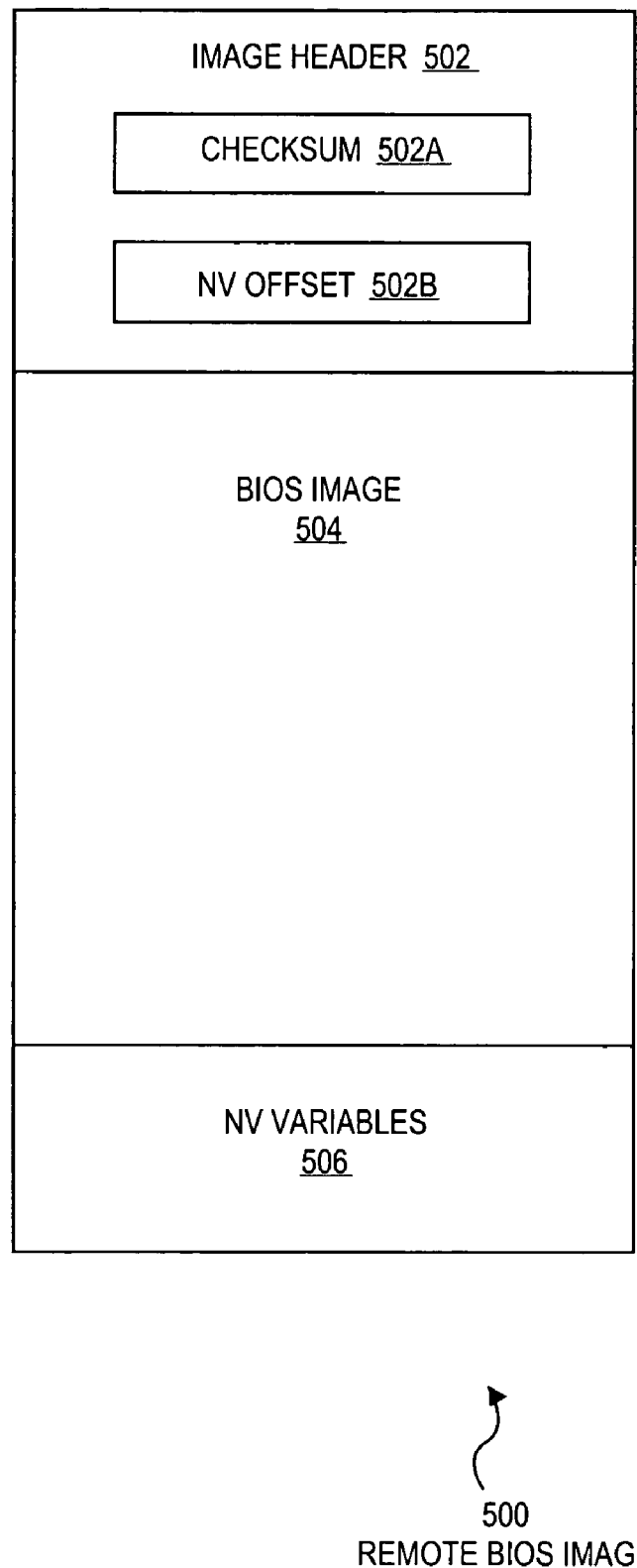
FIG. 5A is a block diagram illustrating one embodiment of a remote BIOS image in accordance with the teachings of the present invention.

Turning to FIG. 5A, an embodiment of a remote BIOS image 500 is shown. RBI 500 includes image header 502, BIOS image 504, and non-volatile (NV) variables 506. Image header 502 includes a checksum 502a and an NV offset 502B.

Checksum 502a may be used to determine if RBI 500 has changed since it was first loaded on the computer system. In one embodiment, checksum 502a is associated with BIOS image 504. In another embodiment, checksum 502a is associated with BIOS image 504 and NV variables 506. In one embodiment, checksum 502a is a value that is read and stored by controller 110. In another embodiment, checksum 502a is a value that is recalculated and stored by controller 110 when controller 110 receives RBI 500. While embodiments described herein use a checksum, it will be understood that other embodiments may include other methods to verify the contents of a remote BIOS image.

NV Offset 502B indicates the distance from the image header 502 that NV variables 506 begin. In one embodiment, NV variables 506 may include configuration information for the computer system that may be used by code executing during the pre-boot phase. In another embodiment, some NV variables 506 may be used by code executing during OS runtime. In one embodiment, NV variables 506 include Non-Volatile Random Access Memory (NVRAM) variable information in compliance with the EFI specification. In yet another embodiment, NV variables 506 include a collection of data, while the BIOS image 504 includes one or more blocks of executable code.

Figure 5B:
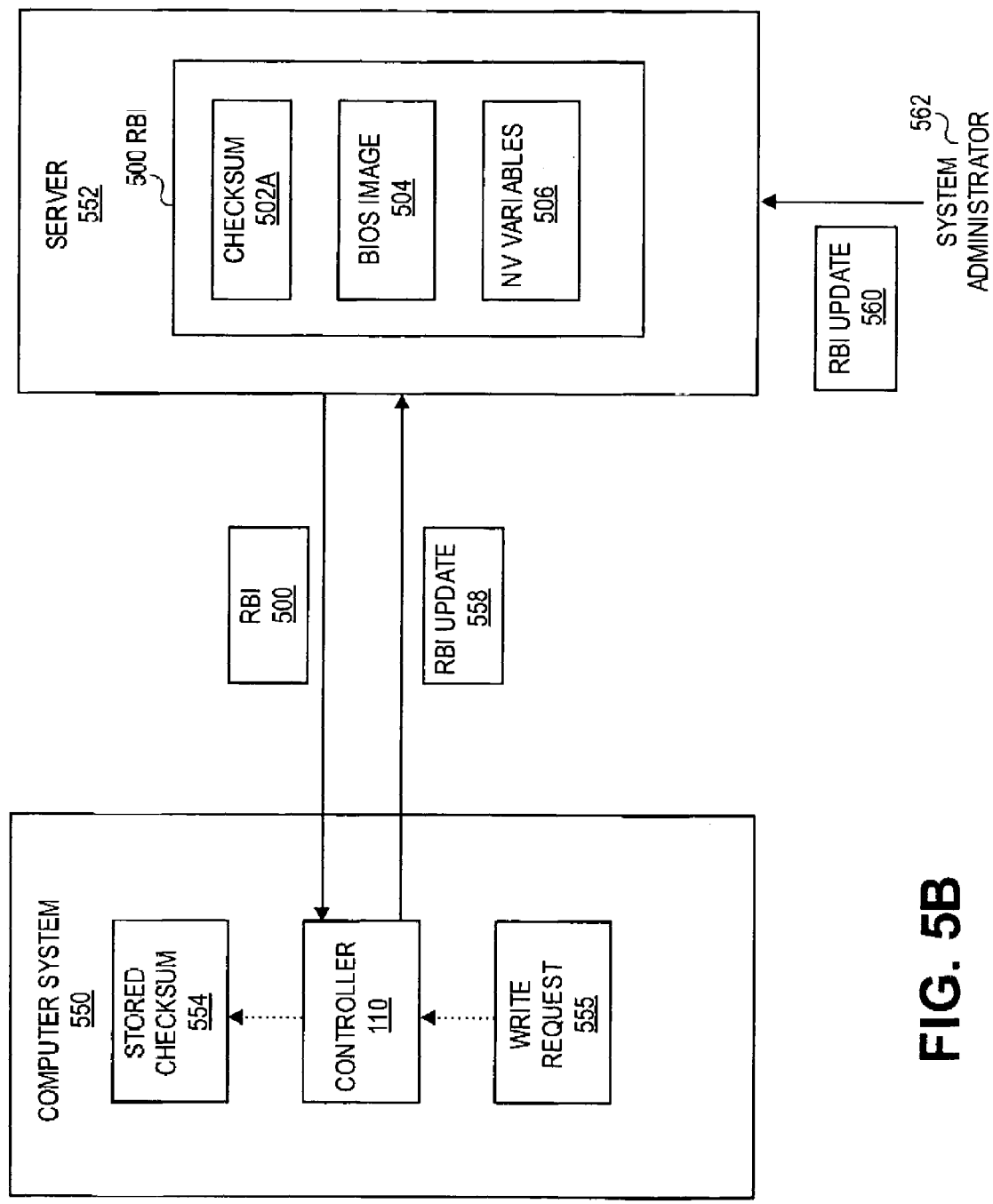
FIG. 5B is a block diagram illustrating one embodiment of an environment that supports booting from a remote BIOS image in accordance with the teachings of the present invention.

Turning to FIG. 5B, a computer system 550 is communicatively coupled to a server 552. Server 552 has stored remote BIOS image 500. RBI 500 includes checksum 502a, BIOS image 504, and NV Variables 506.

In one embodiment, during pre-boot of computer system 550, controller 110 fetches RBI 500 from server 552. Controller 110 also stores a copy of checksum 502a as stored checksum 554 at computer system 550. In one embodiment, the stored checksum 554 may be used by controller 110 to determine if the remote BIOS image 500 on the server 552 has changed since the initial fetch of RBI 500 at startup.

Referring back to FIG. 4, in a decision block 412, the logic determines if an access request to NVS has occurred. If the answer is no, then the logic proceeds to a block 432 to continue operations of the computer system. The logic then returns to decision block 412.

If the answer to decision block 412 is yes, then the logic intercepts the access request and proceeds to a decision block 416 to determine if a write request has been made to NVS. If the answer is no, then the logic assumes a read request and proceeds to a block 418 to read the portion of the remote BIOS image based on the read request. In one embodiment of FIG. 5B, controller 110 communicates with server 552 to perform the read request of RBI 500. In another embodiment, the read request is made to the remote BIOS image cached at the computer system.

After block 418, the logic proceeds to block 432 to continue operations of the computer system.

If the answer to decision block 416 is yes, then the logic proceeds to decision block 422 to determine if the RBI on the server has changed since the RBI was initially retrieved. In one embodiment, the logic determines if the stored checksum at the computer system matches the checksum currently residing on the server.

If the answer to decision block 422 is no, then the logic proceeds to a block 430 to send the RBI update to the server based on the write request. In one embodiment, from the computer system's point of view, a Flash update of NVS is being performed. However, in reality, the remote BIOS image is being updated accordingly based on the Flash update. In one embodiment of block 430, the RBI cached at the computer system and the stored checksum are also updated to reflect the update of the RBI on the server. After block 430, the logic proceeds to block 432 to continue operations of the computer system.

Referring to FIG. 5B, in one example, a write request 555 to update the local BIOS image of computer system 550 is made. Controller 110 intercepts write request 555. In this example, since the stored checksum 554 matches the current value of checksum 502a, controller 110 sends RBI update 558 to server 552 based on write request 555.

Returning to decision block 422, if the answer is yes, then the logic proceeds to a decision block 424. In decision block 424, the logic determines if only one or more NV variables of the remote BIOS image are to be updated. If the answer to decision block 424 is yes, then the logic proceeds to a block 428 to send a RBI update of the NV variables to the server based on the write request. The logic then continues to block 432.

If the answer to decision block 424 is no, then the logic proceeds to a block 426 to fail the write request. In one embodiment of block 426, an error message is displayed to the user of the computer system indicating the write to the NVS has failed or is not permitted. The logic then continues to a block 432.

Turning again to FIG. 5B, in one example, controller 110 intercepts write request 555. In this example, write request 555 includes updates to BIOS image 504. However, stored checksum 554 does not match checksum 502a on server 552. A system administrator 562 has changed RBI 500 using RBI update 560. RBI 500 as was originally retrieved by controller 110 during this boot cycle has changed. Thus, in order to prevent RBI update 558 from stepping on RBI update 560, the write request 555 is failed.

In another example, assume that write request 555 includes only updates to NV variables 506. Also, stored checksum 554 does not match checksum 502a because system administrator 562 has updated RBI 500 using RBI update 560. However, in this example, since write request 555 includes only updates to NV variables 506, RBI update 558 is sent to server 552. In one embodiment, changes to NV variables 506 may include configuration changes to the computer system that may be used by BIOS image 504.

Figure 6:
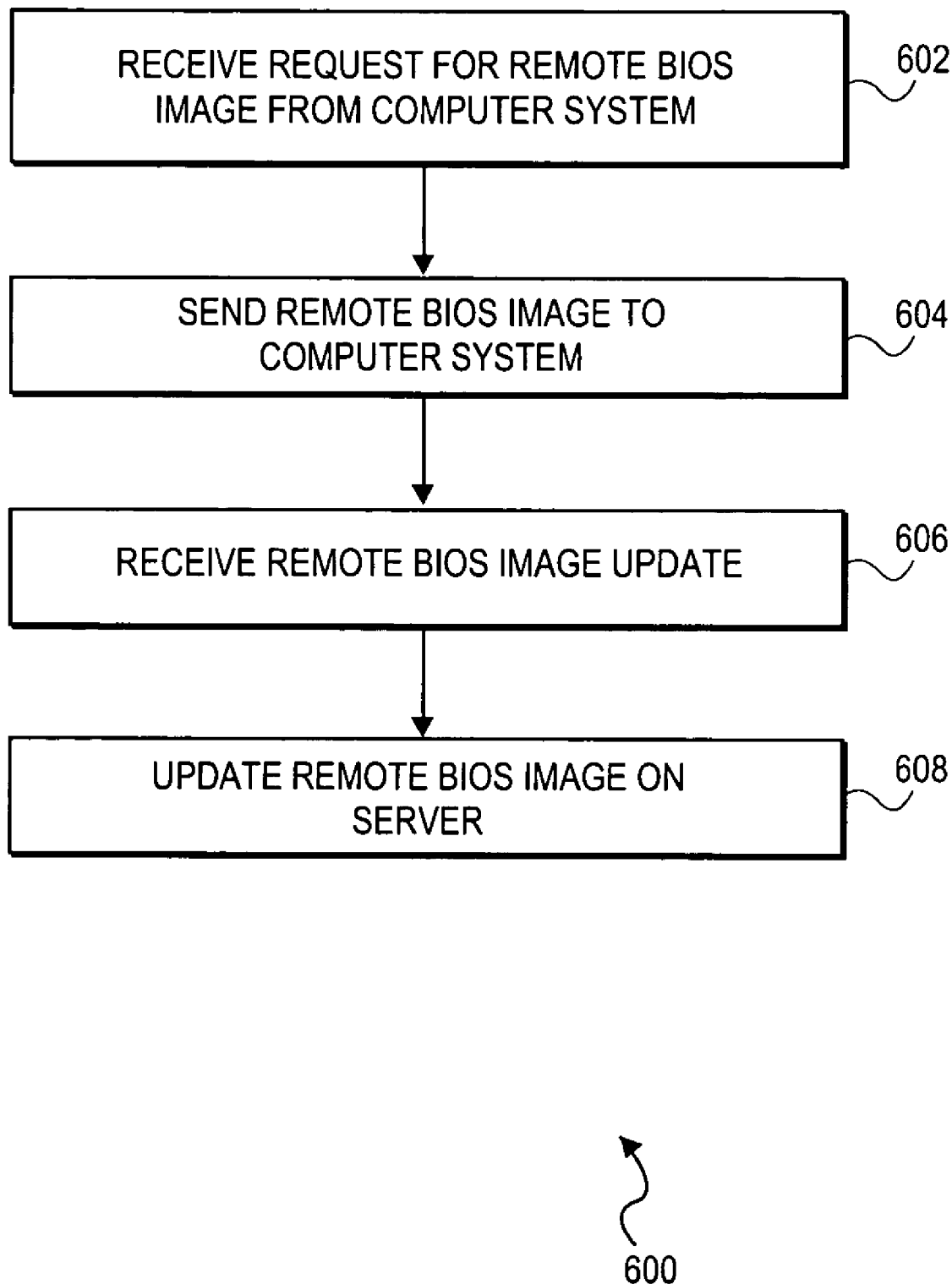
FIG. 6 is a flowchart illustrating one embodiment of the logic and operations to boot from a remote BIOS image in accordance with the teachings of the present invention.

Turning to FIG. 6, a flowchart 600 illustrates an embodiment of the logic and operations by a server to support booting from a remote BIOS image. Starting in a block 602, the server receives a request for a remote BIOS image from a computer system. In response to the request, the server sends the remote BIOS image to the computer system, as shown in a block 604.

Proceeding to a block 606, the server receives a remote BIOS image update. In one embodiment, the RBI update is received from the computer system over a network. In another embodiment, the RBI update is provided to the server at a server workstation. In this embodiment, the RBI update may be loaded on the server from a CD-ROM, downloaded from an Internet site, or the like. In a block 608, the remote BIOS image on the server is updated using the received remote BIOS image update. Embodiments of the present invention allow a system administrator to update a BIOS image for one or more computer systems on a network by simply updating their respective remote BIOS images on server 552.

Figure 7:
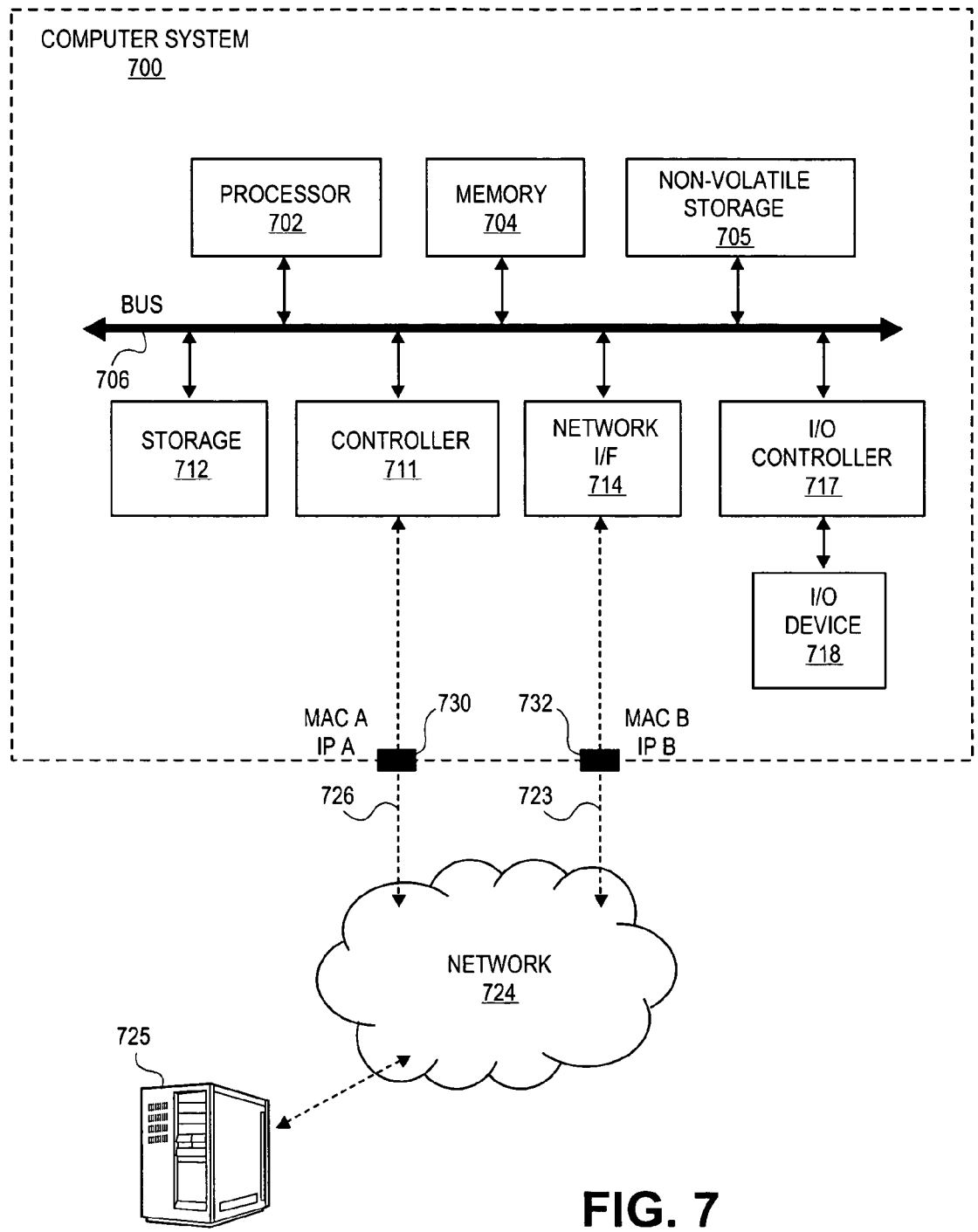
FIG. 7 is a block diagram illustrating one embodiment of a computer system to implement embodiments of the present invention.

FIG. 7 is an illustration of one embodiment of an example computer system 700 on which embodiments of the present invention may be implemented. Computer system 700 includes a processor 702 coupled to a bus 706. Memory 704, storage 712, non-volatile storage 705, and network interface 714 are also coupled to bus 706. Input/output (I/O) device 718 is coupled to bus 706 via I/O controller 717. Embodiments of computer system 700 include, but are not limited to a desktop computer, a notebook computer, a server, a personal digital assistant, a network workstation, or the like.

The computer system 700 may interface to external systems through the network interface 714. Network interface 714 may include, but is not limited to, a modem, a network interface card (NIC), or other interfaces for coupling a computer system to other computer systems. A carrier wave signal 723 is received/transmitted by network interface 714. In the embodiment illustrated in FIG. 7, carrier wave signal 723 is used to interface computer system 700 with a network 724, such as a local area network (LAN), a wide area network (WAN), the Internet, or any combination thereof. In one embodiment, network 724 is further coupled to a remote computer 725 such that computer system 700 and remote computer 725 may communicate over network 724.

Computer system 700 may also include a controller 711 coupled to bus 706. Controller 711 may be used to boot computer system 700 using a remote BIOS image residing on remote computer 725, in accordance with embodiments described herein. Controller 711 may communicate with network 724 using a carrier wave signal 726. Controller 711 may include a controller network interface (not shown) for connecting to network 724.

In one embodiment, controller 711 is coupled to a port 730 having MAC address A and IP address A, and network interface 714 is coupled to a port 732 having MAC address B and IP address B. In this particular embodiment, computer system 700 is viewed by network 724 as two distinct nodes. In one embodiment, controller 711 and port 730 serve as an OOB channel for management and control information.

Processor 702 may include, but is not limited to, an Intel Corporation x86, Pentium®, Xeon®, or Itanium® family processor, a Motorola family processor, or the like. In one embodiment, computer system 700 may include multiple processors. Memory 704 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. I/O device 718 may include a keyboard, a mouse, a display, a printer, a scanner, a disk drive, or the like.

The computer system 700 also includes non-volatile storage 705 on which firmware instructions and/or data may be stored. Non-volatile storage devices include, but are not limited to, Read-Only Memory (ROM), Flash memory, Erasable Programmable Read Only Memory (EPROM), Electronically Erasable Programmable Read Only Memory (EE- PROM), Non-Volatile Random Access Memory (NVRAM), or the like. Storage 712 includes, but is not limited to, a magnetic hard disk, a magnetic tape, an optical disk, or the like. It is appreciated that instructions executable by processor 702 may reside in storage 712, memory 704, non-volatile storage 705, controller 711 or may be transmitted or received via network interface 714 or via controller 711.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., read only memory (ROM), random access memory (RAM), magnetic disk storage media, optical storage media, a flash memory device, etc.). In addition, a machine-accessible medium may include propagated signals such as electrical, optical, acoustical or other form of propagated signals (e.g., carrier waves, infrared signals, digital signals, etc.).

It will be appreciated that in one embodiment, computer system 700 may execute operating system software. For example, one embodiment of the present invention utilizes Microsoft Windows® as the operating system for computer system 700. Other operating systems that may also be used with computer system 700 include, but are not limited to, the Apple Macintosh operating system, the Linux operating system, the Unix operating system, or the like.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. A method, comprising:
    intercepting a request for a local Basic Input/Output System (BIOS) image of a computer system by a controller of the computer system;
    retrieving a remote BIOS image for the computer system from a remote computer system communicatively coupled to the computer system via the controller;
    executing the remote BIOS image by the computer system;
    intercepting a write request to a non-volatile storage of the computer system; and
    sending a remote BIOS image update to the remote computer system based on the write request.

2. The method of claim 1, further comprising:
    intercepting a read request to a non-volatile storage of the computer system; and
    reading the remote BIOS image based on the read request.

3. The method of claim 2, wherein reading the remote BIOS image includes reading a cached remote BIOS image cached at the computer system.

4. The method of claim 1,
    a wherein the remote BIOS image update is sent to the remote computer system based on the write request if the remote BIOS image stored on the remote computer system has not changed since the remote BIOS image was retrieved.

5. The method of claim 4 wherein determining if the remote BIOS image stored on the remote computer system has not changed includes determining if a stored checksum associated with the remote BIOS image on the computer system matches a current checksum of the remote BIOS image on the remote computer system.

6. The method of claim 4, further comprising sending the remote BIOS image update to the remote computer system if the write request updates only one or more non-volatile variables associated with the remote BIOS image.

7. The method of claim 4, further comprising failing the write request if the remote BIOS image stored on the remote computer system has changed since the remote BIOS image was retrieved and if the write request updates other than one or more non-volatile variables associated with the remote BIOS image.

8. The method of claim 1 wherein in the computer system does not include a non-volatile storage having stored the local BIOS image.

9. An article of manufacture comprising:
    a machine-accessible recordable/non-recordable medium that stores a plurality of instructions which when executed perform operations comprising:
    intercepting a request for a local Basic Input/Output System (BIOS) image of a computer system during a pre-boot phase of the computer system;
    retrieving a remote BIOS image for the computer system from a remote computer system communicatively coupled to the computer system during the pre-boot phase;
    intercepting a write request to a non-volatile storage of the computer system; and
    sending a remote BIOS image update to the remote computer system based on the wnte request.

10. The article of manufacture of claim 9 wherein execution of the plurality of instructions further perform operations comprising caching the remote BIOS image at the computer system.

11. The article of manufacture of claim 10 wherein execution of the plurality of instructions further perform operations comprising
    intercepting a read request to a non-volatile storage of the computer system; and
    using the cached remote BIOS image to respond to the read request.

12. The article of manufacture of claim 9 wherein execution of the plurality of instructions further perform operations comprising:
    sending a remote BIOS image update to the remote computer system based on the write request if the remote B LOS image stored on the remote computer system has not changed since the remote BIOS image was retrieved.

13. The article of manufacture of claim 12 wherein determining if the remote BIOS image stored on the remote computer system has not changed includes determining if a stored checksum associated with the remote BIOS image on the computer system matches a current checksum of the remote BIOS image on the remote computer system.

14. The article of manufacture of claim 12 wherein execution of the plurality of instructions further perform operations comprising sending the remote BIOS image update to the remote computer system if the write request updates only one or more non-volatile variables associated with the remote BIOS image.

15. The article of manufacture of claim 12 wherein execution of the plurality of instructions further perform operations comprising failing the write request if the remote BIOS image stored on the remote computer system has changed since the remote BIOS image was retrieved and if the write request updates other than one or more non-volatile variables associated with the remote BIOS image.

16. The article of manufacture of claim 9 wherein intercepting the request for the local BIOS image includes monitoring a Serial Peripheral Interface (SPI) bus of the computer system during the pre-boot phase for a start vector associated with the local BIOS image.

17. A computer system, comprising:
a flash memory device having stored a local Basic Input/Output System (BIOS) image for the computer system; and
a controller operatively coupled to the flash memory device, the controller including:
a processor;
a controller network interface operatively coupled to the processor; and
a non-volatile storage operatively coupled to the processor, the non-volatile storage including firmware instructions which when executed by the processor perform operations comprising:
intercepting a request to the flash memory device for the local BIOS image;
retrieving a remote BIOS image for the computer system from a server communicatively coupled to the computer system at the controller network interface;
intercepting a write request to a non-volatile storage of the computer system; and
sending a remote BIOS image update to the remote computer system based on the write request.

18. The computer system of claim 17 wherein the controller network interface to serve as a manageability port accessible by the server to conduct network management tasks associated with the computer system.

19. The computer system of claim 17 wherein execution of the firmware instructions further perform operations comprising:
intercepting a read request to the flash memory device; and
reading the remote BIOS image based on the read request.

20. The computer system of claim 19 reading the remote BIOS image includes reading a cached remote BIOS image cached at the computer system.

21. The computer system of claim 17 wherein execution of the firmware instructions further perform operations comprising:
sending a remote BIOS image update to the server based on the write request using the controller network interface if the remote BIOS image stored on the server has not changed since the remote BIOS image was retrieved.

22. The computer system of claim 21 wherein determining if the remote BIOS image stored on the server has not changed includes determining if a stored checksum associated with the remote BIOS image on the computer system matches a current checksum of the remote BIOS image on the server.

23. The computer system of claim 22 wherein execution of the firmware instructions further perform operations comprising:
updating the stored checksum based on the remote BIOS image update; and
updating a cached remote BIOS image at the computer system based on the remote BIOS image update.

24. The computer system of claim 21 wherein execution of the firmware instructions further perform operations comprising sending the remote BIOS image update to the server using the controller network interface if the write request updates only one or more non-volatile variables associated with the remote BIOS image.

25. The computer system of claim 21 wherein execution of the firmware instructions further perform operations comprising failing the write request if the remote BIOS image stored on the server has changed since the remote BIOS image was retrieved and if the write request updates other than one or more non-volatile variables associated with the remote BIOS image.

* * * * *

UNITED STATES PATENT AND TRADEMARK OFFICE
CERTIFICATE OF CORRECTION

PATENT NO. : 7,406,591 B2  Page 1 of 1
APPLICATION NO. : 10/879456
DATED : July 29, 2008
INVENTOR(S) : Rothman et al.

It is certified that error appears in the above-identified patent and that said Letters Patent is hereby corrected as shown below:

In column 10, at line 37, delete "wnte" and insert --write--.
In column 10, at line 53, delete "BLOS" and insert --BIOS--.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,406,591 B2 Page 1 of 1
APPLICATION NO. : 10/879456
DATED : July 29, 2008
INVENTOR(S) : Rothman et al.

It is certified that error appears in the above-identified patent and that said Letters Patent is hereby corrected as shown below:

In column 10, at line 37, delete "wnte" and insert --write--.

In column 10, at line 53, delete "BLOS" and insert --BIOS--.

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

PATENT NO.         : 7,406,591 B2                                          Page 1 of 1
APPLICATION NO. : 10/879456
DATED              : July 29, 2008
INVENTOR(S)        : Michael A. Rothman et al.

It is certified that error appears in the above-identified patent and that said Letters Patent is hereby corrected as shown below:

This certificate vacates the Certificate of Correction issued December 16, 2008. The certificate is a duplicate of the Certificate of Correction issued December 9, 2008. All requested changes were included in the Certificate of Correction issued December 9, 2008.

Signed and Sealed this

Thirteenth Day of January, 2009

JON W. DUDAS
*Director of the United States Patent and Trademark Office*